US010115071B1

(12) United States Patent
Amaral et al.

(10) Patent No.: US 10,115,071 B1
(45) Date of Patent: *Oct. 30, 2018

(54) DISTRIBUTED WORKLOAD MANAGEMENT

(71) Applicant: Manhattan Associates, Inc., Atlanta, GA (US)

(72) Inventors: Kayla Elizabeth Amaral, Atlanta, GA (US); Anup K. G, Bangalore (IN); Shashikala Maracharahalli Bhadraiah, Bangalore (IN); Abhishek Jain, Bangalore (IN); Suhas Prahlada Rao, Kolar (IN); Ranjith Krishnan Nadar, Marietta, GA (US); Vikas Aron, Acworth, GA (US); Baibhav Singh, Marietta, GA (US)

(73) Assignee: Manhattan Associates, Inc., Atlanta, GA (US)

( * ) Notice: Subject to any disclaimer, the term of this patent is extended or adjusted under 35 U.S.C. 154(b) by 212 days.

This patent is subject to a terminal disclaimer.

(21) Appl. No.: 14/990,660

(22) Filed: Jan. 7, 2016

Related U.S. Application Data

(60) Provisional application No. 62/101,204, filed on Jan. 8, 2015.

(51) Int. Cl.
*G06F 19/00* (2018.01)
*G06Q 10/08* (2012.01)

(52) U.S. Cl.
CPC .................. *G06Q 10/087* (2013.01)

(58) Field of Classification Search
CPC ..... G06Q 10/087; G06Q 20/203; G06Q 50/28
See application file for complete search history.

(56) References Cited

U.S. PATENT DOCUMENTS

| 7,403,975 | B2 | 7/2008 | Berkery |
| 7,639,140 | B2 | 12/2009 | Shah |
| 7,707,594 | B1 | 4/2010 | Foster et al. |
| 9,633,325 | B2 * | 4/2017 | Bolene ............... G06Q 10/0832 |
| 2003/0046121 | A1 | 3/2003 | Menninger |
| 2004/0030428 | A1 | 2/2004 | Crampton |
| 2005/0240592 | A1 | 10/2005 | Mamou |
| 2006/0069717 | A1 | 3/2006 | Mamou |

(Continued)

OTHER PUBLICATIONS

Amaral, Kayla Elizabeth; U.S. Patent Application entitled: Inventory View Management having U.S. Appl. No. 14/990,652, filed Jan. 7, 2016, 52 pgs.

(Continued)

*Primary Examiner* — Thien M Le
*Assistant Examiner* — April Taylor
(74) *Attorney, Agent, or Firm* — Taylor English Duma, LLP

(57) ABSTRACT

Examples of distributed workload management are disclosed. In one example implementation according to aspects of the present disclosure, a partial data table is received from a main data table. A data view is generated in real time in response to a received data view request. The data view is based at least in part on a plurality of data view configuration properties and the partial data stored in the received partial data table. The partial data table stores data that represents at least a partial copy of main data stored in a main data table. The partial data table and the main data table are then synchronized.

22 Claims, 19 Drawing Sheets

(56) References Cited

U.S. PATENT DOCUMENTS

| | | |
|---|---|---|
| 2006/0129660 A1 | 6/2006 | Mueller |
| 2007/0299804 A1 | 12/2007 | Liu et al. |
| 2008/0250099 A1 | 10/2008 | Shen et al. |
| 2010/0023642 A1 | 1/2010 | Ladd |
| 2010/0287553 A1 | 11/2010 | Schmidt |
| 2011/0063093 A1 | 3/2011 | Fung |
| 2012/0109372 A1* | 5/2012 | Edwards .............. G06Q 10/087 700/241 |
| 2015/0120367 A1 | 4/2015 | Agrawal et al. |

OTHER PUBLICATIONS

Amaral, Kayla Elizabeth; Provisional Patent Application entitled: Inventory View Management having U.S. Appl. No. 62/101,194, filed Jan. 8, 2015, 52 pgs.

Amaral, Kayla Elizabeth; Provisional Patent Application entitled: Distributed Workload Management having U.S. Appl. No. 62/101,204, filed Jan. 8, 2015, 54 pgs.

Fawcett, et al.; Article entitled: "New Sun Fire Servers Nearly Double Supply Chain Management Performance", published Jun. 8, 2004, 12 pgs.

Amaral, Kayla Elizabeth; Non-Final Office Action for U.S. Appl. No. 14/990,652, filed Jan. 7, 2016, dated May 30, 2018, 28 pgs.

\* cited by examiner

700a

| Displaying 1 of 1 record | Updated 16.39:34 | 1 record(s) selected | | | | | |
|---|---|---|---|---|---|---|---|
| Config Name | Description | Execution Service | Sequenced? | Retry Limit | Max Threads | Execute At | Timeout (ms) |
| AvailabilityWorkExecutor | AvailabilityWorkExecutor | com.manh.olm.availabl... | Yes | 0 | 4 | ALL | 900000 |

Work Type Config Details

General

Config Name: AvailabilityWorkExecutor  
Execution Service: com.manh.olm.availability.process.dwm.AvailabilityWorkExecutor  
Retry Limit: 0  
Execute At: ALL Description: AvailabilityWorkExecutor  
Sequenced?: No  
Max Threads 4  
Timeout (ms): 900000

| Group By: | ○ Execute At | ● Work Type | | | | | |
|---|---|---|---|---|---|---|---|
| Work Type | Total Requests | Successes | Failures | Retries | Avg Wait (ms) | Avg Execution (ms) | Avg Total Processing (ms) |
| Availability Work Executor | 1252 | 3872 | 1351 | 0 | 178544 | 402904 | 687265 |
| ATLLW3119.us.manh.com:10000 | 116 | 118 | 0 | 0 | 8915 | 80 | 7559 |
| ATLLW3340.us.manh.com:10000 | 97 | 101 | 8 | 0 | 11894 | 6515 | 19326 |
| ATLLW3351.us.manh.com:10000 | 635 | 729 | 10 | 0 | 825460 | 178537 | 772975 |
| MALT-7452.us.manh.com:10000 | 126 | 124 | 2 | 0 | 17712 | 115 | 19441 |
| MALT-7480.us.manh.com:10000 | 32 | 1988 | 277 | 0 | 45625065 | 337194 | 729892 |
| MALT-7501.us.manh.com:10000 | 36 | 27 | 2 | 0 | 897311 | 2253941 | 3099189 |
| MALT-7651.us.manh.com:10000 | 65 | 103 | 7 | 0 | 15300 | 1424 | 11822 |
| blrlw2114.asia.manh.com:10000 | 36 | 199 | 5 | 0 | 2455601 | 5573819 | 5886410 |
| blrlw3128.asia.manh.com:10000 | 0 | 0 | 2 | 0 | 0 | 924 | 1539 |
| blrlw3222.asia.manh.com:10000 | 0 | 0 | 1027 | 0 | 0 | 1343 | 23709 |
| ma-int0164.asia.manh.com:10000 | 0 | 377 | 0 | 0 | 0 | 12942 | 38597 |
| ma-int0417.asia.manh.com:10000 | 0 | 0 | 10 | 0 | 0 | 610 | 1421 |
| malt-7427.us.manh.com:10000 | 8 | 8 | 0 | 0 | 204 | 6 | 225 |
| malt-7501.us.manh.com:10000 | 49 | 49 | 0 | 0 | 6924 | 11238 | 18914 |
| vrhas5003.us.manh.com:20000 | 52 | 51 | 1 | 0 | 1524 | 9 | 2015 |

| | Work Request | Work Type | Status | Submission Node | Submission Time | Execution Node | Execution Start Time | Execution End Time | Work Request | Retry Count | Worker | Sequence Key |
|---|---|---|---|---|---|---|---|---|---|---|---|---|
| ☒ | 9693 | Availab... | Complete | ATLLW31... | 11/6/14 09... | ATLLW31... | 11/6/14 09... | 11/6/14 09... | Processing a... | 0 | AvailabilityWorkEx... | 465 |
| ☐ | 9692 | Availab... | Complete | ATLLW31... | 11/6/14 09... | ATLLW31... | 11/6/14 09... | 11/6/14 09... | Processing a... | 0 | AvailabilityWorkEx... | 541 |
| ☐ | 9691 | Availab... | Complete | ATLLW31... | 11/6/14 09... | ATLLW31... | 11/6/14 09... | 11/6/14 09... | Processing a... | 0 | AvailabilityWorkEx... | 581 |
| ☐ | 9690 | Availab... | Complete | ATLLW31... | 11/6/14 09... | ATLLW31... | 11/6/14 09... | 11/6/14 09... | Processing a... | 0 | AvailabilityWorkEx... | 821 |
| ☐ | 9689 | Availab... | Complete | ATLLW31... | 11/5/14 09... | ATLLW31... | 11/5/14 09... | 11/5/14 09... | Processing a... | 0 | AvailabilityWorkEx... | 465 |
| ☐ | 9688 | Availab... | Complete | ATLLW31... | 11/5/14 09... | ATLLW31... | 11/5/14 09... | 11/5/14 09... | Processing a... | 0 | AvailabilityWorkEx... | 541 |
| ☐ | 9687 | Availab... | Complete | ATLLW31... | 11/5/14 09... | ATLLW31... | 11/5/14 09... | 11/5/14 09... | Processing a... | 0 | AvailabilityWorkEx... | 581 |
| ☐ | 9686 | Availab... | Complete | ATLLW31... | 11/5/14 09... | ATLLW31... | 11/5/14 09... | 11/5/14 09... | Processing a... | 0 | AvailabilityWorkEx... | 821 |
| ☐ | 9685 | Availab... | Complete | MALT-75... | 11/4/14 09... | MALT-75... | 11/4/14 09... | 11/4/14 09... | Processing a... | 0 | AvailabilityWorkEx... | 541 |
| ☐ | 9684 | Availab... | Complete | MALT-75... | 11/4/14 09... | MALT-75... | 11/4/14 09... | 11/4/14 09... | Processing a... | 0 | AvailabilityWorkEx... | 465 |
| ☐ | 9683 | Availab... | Complete | MALT-75... | 11/4/14 09... | MALT-75... | 11/4/14 09... | 11/4/14 09... | Processing a... | 0 | AvailabilityWorkEx... | 581 |
| ☐ | 9682 | Availab... | Complete | MALT-75... | 11/4/14 09... | MALT-75... | 11/4/14 09... | 11/4/14 09... | Processing a... | 0 | AvailabilityWorkEx... | 821 |

Work Request Details

Work Request ID: 9693
Work Type: AvailabilityWorkExecutor
Status: Complete
Submission Date/Time: 11/6/14 09:31:50 EST
Execution Node: ATLLW3119.us.manh.com:10024
Execution Start Date/Time: 11/6/14 09:31:50 EST Execution End Date/Time: 11/6/14 09:31:50 EST
Work Request: Processing availability for viewId465
Submission Node: ATLLW3119.us.manh.com:10024
Retry Count: 0
Worker: AvailabilityWorkExecutor2
Sequence Key: 465

*FIG. 7c*

DISTRIBUTED WORKLOAD MANAGEMENT

CROSS REFERENCE TO RELATED APPLICATIONS

This application claims the benefit of provisional patent application Ser. No. 62/101,204, filed Jan. 8, 2015, which is incorporated herein by reference in its entirety.

BACKGROUND

Distributed management systems provide the ability to manage data in and across distributed computing systems. For example, inventory systems used in commercial, retail, and supply chain implementations utilize inventory data to track various inventory information. The inventory data may indicate the number of units of items on hand, where inventory is physically located, when out-of-stock inventory may be made available, when inventory is becoming low, and the like. Data management systems may also be utilized in a variety of other implementations, such as when large amounts of data resides across multiple computing systems and many users request views of the data in real time.

BRIEF DESCRIPTION OF THE DRAWINGS

The following detailed description references the drawings, in which:

FIGS. 7a-7c illustrate screenshots of a distributed workload management interface according to examples of the present disclosure;

DETAILED DESCRIPTION

Figure 1:
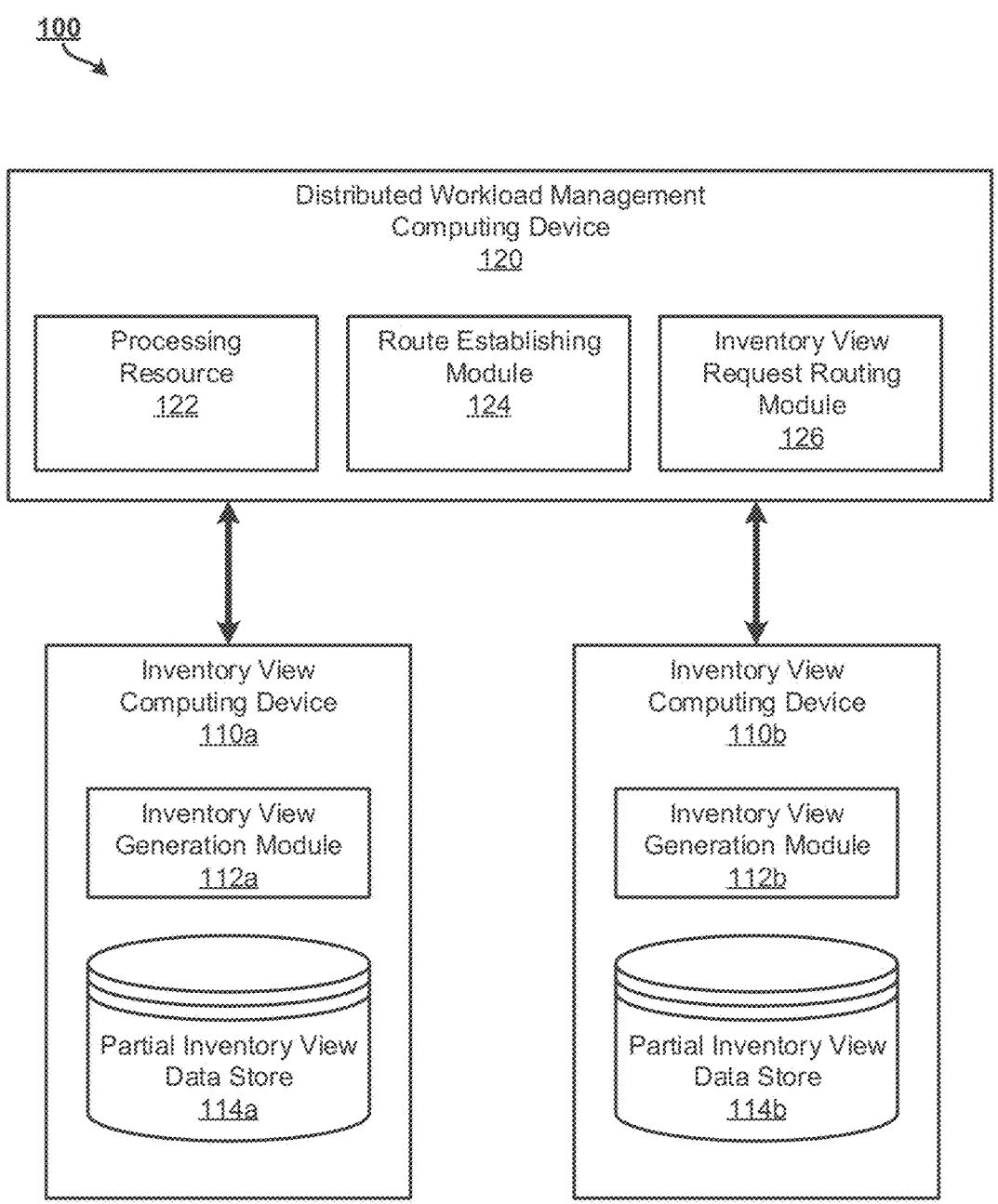
FIG. 1 illustrates a distributed computing system including a distributed workload management computing device and inventory view computing devices and according to examples of the present disclosure.

Distributed workload management systems enable large amounts of data to be maintained and provided to users in real time. For example, users of distributed workload management systems may need access to views of data in real time. For example, in retail and other commerce environments, a buyer (such as in an online e-commerce implementation) or an employee (such as in a brick-and-mortar implementation) may need access to up-to-date inventory data. In the situation of a buyer shopping on a website, the buyer may desire to know whether an item is in stock and available, either to be delivered or to be picked up in a store. Similarly, an employee may desire to know which stores have which items and/or how many units of an item (such as for store-to-store transfers or order fulfillment). Additionally, administrative users, such as supply chain managers may wish to view a variety of inventory data to maintain inventory for ordering, fulfillment, and other needs. Consequently, different types of users may desire to view inventory data in different ways, with different information and configurations for each user.

In some situations, the data, such as inventory data, is maintained on a single computing device (i.e., server). However, this approach fails to provide redundancy and scalability. Moreover, single computing device implementations may be slow or have other latency issues. In other situations, multiple computing devices may each retain copies of the data. While this multi-computing device approach may reduce latency and provides scalability, it becomes difficult to maintain accuracy among the various copies of the data.

Various implementations are described herein by referring to several examples of distributed workload management. In one example implementation according to aspects of the present disclosure, a plurality of inventory views are configured by defining a plurality of inventory view configuration properties for each of the plurality of inventory views. Each of the plurality of inventory views are associated with one of a plurality of inventory view computing devices. An inventory view request to display a particular inventory view is routed to the appropriate one of the plurality of inventory view computing devices based on an established routing configuration. Inventory data is then caused to be displayed, in real time, using the particular inventory view based at least in part on the plurality of inventory view configuration properties related to the inventory view request to display the particular inventory view.

In some implementations, the distributed workload management techniques described herein provide increased computing efficiencies by distributing inventory view requests among several view computing devices. This enables failover and redundancy such that if one view computing device fails, its functionality may be migrated to another view computing device. This also enables computing loads to be scaled and distributed among the individual computing devices within a distributed workload management system. As the amount of data and/or the number and types of data views increase, additional view computing devices may be added to handle the increased demands.

Moreover, a distributed workload management computing device manages the data and data flow independently of the data view computing devices. In some examples, database table partitioning provides the ability to generate data views in real time by storing local copies of database tables and the related data on the appropriate data view computing devices. This eliminates the need for the data view computing devices to query a main database, remote from the data view computing devices, when generating each data view request, enabling real time data view generation. The described techniques are particularly well suited in commerce deployments to manage inventory data. Particularly, the present techniques enable high volume, mission critical transaction processing in real time. These and other advantages will be apparent from the description that follows.

The figures include particular components, modules, instructions etc. according to various examples as described herein. In different implementations, more, fewer, and/or other components, modules, instructions, arrangements of components/modules/instructions, etc. may be used according to the teachings described herein. In addition, various components, modules, etc. described herein may be implemented as instructions stored on a computer-readable storage medium, hardware modules, special-purpose hardware (e.g., application specific hardware, application specific integrated circuits (ASICs), embedded controllers, hardwired circuitry, etc.), or some combination or combinations of these.

Generally, the figures relate to components and modules of a distributed computing system including individual computing devices within the distributed computing system. It should be understood that the distributed computing system and/or the individual computing devices may include any appropriate type or combination of computing system and/or computing device such as a distributed computing system, which may include a plurality of servers. In examples, other types or combinations of computing systems and/or computing devices may be implement, including for example smartphones, tablets, desktops, laptops, workstations, servers, rack servers, blade servers, smart monitors, smart televisions, digital signage, scientific instruments, retail point of sale devices, video walls, imaging devices, peripherals, networking equipment, or the like.

FIG. 1 illustrates a distributed computing system 100 including a distributed workload management computing device 120 and inventory view computing devices 110a and 110b according to examples of the present disclosure. Generally, in the present example, a user may request an inventory view via the distributed workload management (DWM) computing device 120. An inventory view provides information on the availability of inventory. The inventory view request is routed to an appropriate one of the inventory view computing devices 110a and 110b, and the requested view is returned to the user (to be displayed on a device of the user) by the appropriate one of the inventory view computing devices 110a and 110b. The inventory view is configured within the DWM computing device 120 to define inventory availability. Each view may present a picture of available inventory after considering various factors that may impact the availability, including location of inventory, amount of inventory, access to inventory, inventory restrictions, and other factors. Depending on needs, several views can be created to address different scenarios. For example, a multi-channel retailer may need multiple commerce views to represent the different channels, delivery options, and engagement points. If the pool of eligible inventory differs for the order capture path, then a separate inventory view may be utilized. In examples, the DWM computing device 120 may update the inventory views automatically, such as when inventory unit amounts change, when inventory outages occur, when rules change (e.g., protection rules) or the like, thus providing users with up-to-date inventory information. This may be useful, for example, when a user has requested a view, and the inventory information.

The inventory view computing devices 110a and 110b may be physical and/or virtual computing devices having appropriate computing hardware, such as a processing resource, a memory resource, a network interface, a data store, and the like, or combinations and/or pluralities thereof. For example, the inventory view computing devices 110a and 110b may include a processing resource (not shown) that represents generally any suitable type or form of processing unit or units capable of processing data or interpreting and executing instructions. The processing resource may be one or more central processing units (CPUs), microprocessors, and/or other hardware devices suitable for retrieval and execution of instructions. The instructions may be stored, for example, on a non-transitory tangible computer-readable storage medium, such as a computer-readable storage medium, which may include any electronic, magnetic, optical, or other physical storage device that store executable instructions. Thus, the memory resource may be, for example, random access memory (RAM), electrically-erasable programmable read-only memory (EPPROM), a storage drive, an optical disk, and any other suitable type of volatile or non-volatile memory that stores instructions to cause a programmable processor to perform the techniques described herein. In examples, memory resource includes a main memory, such as a RAM in which the instructions may be stored during runtime, and a secondary memory, such as a nonvolatile memory in which a copy of the instructions is stored.

Alternatively or additionally, the inventory view computing devices 110a and 110b may include dedicated hardware, such as one or more integrated circuits, Application Specific Integrated Circuits (ASICs), Application Specific Special Processors (ASSPs), Field Programmable Gate Arrays (FPGAs), or any combination of the foregoing examples of dedicated hardware, for performing the techniques described herein. In some implementations, multiple processing resources (or processing resources utilizing multiple processing cores) may be used, as appropriate, along with multiple memory resources and/or types of memory resources. It should be understood that, although two inventory view computing devices 110a and 110b are illustrated in FIG. 1, more or less inventory view computing devices may be implemented.

In the example illustrated in FIG. 1, each of the inventory view computing devices 110a and 110b includes an inventory view generation module (e.g., inventory view generation modules 112a and 112b) and a partial inventory view data store (e.g., inventory view generation module 114a and 114b). In one example, the modules described herein may be a combination of hardware and programming. The programming may be processor executable instructions stored on a tangible memory resource (such as a computer-readable storage medium), and the hardware may include a processing resource for executing those instructions. Thus memory resource can be said to store program instructions that when executed by the processing resource implement the modules described herein. Other modules may also be utilized as will be discussed further below in other examples.

The inventory view generation modules 112a and 112b generate, in real time, an inventory view based on inventory view configuration properties responsive to an inventory view request. It should be understood that real time may mean that the inventory view generation modules 112a and 112b generate the inventory view under a time constraint. For example, the inventory view may be constrained to be generated within a particular time constraint or else a failure occurs. This enables up-to-date data to be delivered, for if the time constraint were removed, a request may be delayed such that the information generated in the inventory view may be out-of-date. In examples, the time constraint is milliseconds or even microseconds. The time constraint may be altered depending on a variety of factors, including based on the type of inventory view requested, the particular inventory view computing device generating the inventory view, the type or location of the user requesting the inventory view, etc.

The inventory view generation modules 112a and 112b generate, responsive to receiving an inventory view request, an inventory view based on inventory view configuration properties, which contain information about inventory views. A variety of inventory views may be defined through the inventory view configuration properties, for example, based on who is requesting the view. For instance, different stakeholders may desire different information to be displayed in an inventory view. A store manager, for example, may want to view inventory information about his store, while a distribution center manager may want to view inventory information about his distribution center. The different inventory views are defined by the inventory view configuration properties. Moreover, the inventory view configuration properties enable multiple configurations for each inventory view. For example, each configuration may provide availability settings (e.g., a different rule set for each supplier; a per store, per item, per supplier inventory view, etc.). Other settings may also be configured in the inventory view configuration properties, including synchronization settings for syncing the partial inventory data (discussed below), notification settings, fulfillment outages, etc. Examples of the inventory views (referred to as commerce views) and the related configuration properties are discussed below regarding FIG. 6.

The inventory view computing devices 110a and 110b may also include partial inventory view data stores 114a and 114b. The partial inventory view data stores 114a and 114b may be repositories to store data, such as inventory data (i.e., partial inventory data) and inventory view configuration properties. Inventory data, as discussed, may indicate number of units of items on hand, where data is physically located, when out of stock data may be made available, when inventory is becoming low, and the like. The inventory data stored by partial inventory view data stores 114a and 114b is, in some examples, partial inventory data retrieved from a main inventory data store. That is, the partial inventory data is a partial copy of main inventory data stored on a main inventory data store accessible by the distributed computing system. The partial inventory data may be, for example, the inventory data related to the views generated by the associated inventory view computing device 110a. In other words, if the inventory view computing device 110a utilizes certain data from the main data store, but not all of it, the partial inventory view data store 114a of the inventory view computing device 110a may only store the inventory data used to generate the inventory views associated with the inventory view computing device 110a (e.g., the partial inventory data).

In examples, as discussed below, the partial inventory view data stores 114a and 114b may use tables to store the data, including the partial inventory data. The main inventory data store is communicatively coupleable to the distributed workload management computing device to store inventory data, and the inventory view generation modules 112a and 112b access and utilize the inventory data to generate the inventory view. Data copying rules may be implemented to determine which data is copied between the main inventory data and the partial inventory data. For example, the rules may describe which inventory data is copied, how the data is translated into different structures depending on the target inventory view computing device, and the like. Moreover, the rules may define what type of data and which data fields are copied. In examples, data records may be partially or wholly copied to the partial inventory view data store from the main inventory view data store.

The inventory view computing devices 110a and 110b are communicatively couplable to a distributed workload management computing device 120, such as by a network. For example, a network, depicted by the connecting arrows between the DWM computing device 120 and the inventory view computing devices 110a and 110b, represents generally hardware components and computers interconnected by communications channels that allow sharing of resources and information. The network may include one or more of a cable, wireless, fiber optic, or remote connection via a telecommunication link, an infrared link, a radio frequency link, or any other connectors or systems that provide electronic communication. The network may include, at least in part, an Intranet, the internet, or a combination of both. The network may also include intermediate proxies, routers, switches, load balancers, and the like. The paths followed by the network between the DWM computing device 120 and the inventory view computing devices 110a and 110b, as depicted in FIG. 1, represent the logical communication paths between these devices, not necessarily the physical paths between the devices.

The distributed workload management (DWM) computing device 120 may include a processing resource 122 that represents generally any suitable type or form of processing unit or units capable of processing data or interpreting and executing instructions. The processing resource 122 may be one or more central processing units (CPUs), microprocessors, and/or other hardware devices suitable for retrieval and execution of instructions. The instructions may be stored, for example, on a non-transitory tangible computer-readable storage medium, such as computer-readable storage medium 330 of FIG. 3, which may include any electronic, magnetic, optical, or other physical storage device that stores executable instructions. Thus, the memory resource may be, for example, random access memory (RAM), electrically-erasable programmable read-only memory (EPPROM), a storage drive, an optical disk, and any other suitable type of volatile or non-volatile memory that stores instructions to cause a programmable processor to perform the techniques described herein. In examples, memory resource includes a main memory, such as a RAM in which the instructions may be stored during runtime, and a secondary memory, such as a nonvolatile memory in which a copy of the instructions is stored.

Alternatively or additionally, the DWM computing device 120 may include dedicated hardware, such as one or more integrated circuits, Application Specific Integrated Circuits (ASICs), Application Specific Special Processors (ASSPs), Field Programmable Gate Arrays (FPGAs), or any combination of the foregoing examples of dedicated hardware, for performing the techniques described herein. In some implementations, multiple processing resources (or processing resources utilizing multiple processing cores) may be used, as appropriate, along with multiple memory resources and/or types of memory resources.

In addition, the DWM computing device 120 may include a route establishing module 124 and an inventory view request module 126. In one example, the modules described herein may be a combination of hardware and programming. The programming may be processor executable instructions stored on a tangible memory resource (such as computer-readable storage medium 230 of FIG. 2), and the hardware may include processing resource 122 for executing those instructions. Thus memory resource can be said to store program instructions that when executed by the processing resource 122 implement the modules described herein. In other examples, the modules may be dedicated hardware, such as one or more integrated circuits, ASICs, ASSPs, FPGAs, or any suitable combination thereof. Other modules may also be utilized as will be discussed further below in other examples.

The route establishing module 124 establishes a route for each of the inventory view requests to an appropriate one of the inventory view computing devices 110a and 110b based at least in part on a view type property. The view type property may indicate what type of view is requested, who is requesting the view, what inventory data may be used to generate the view, and the like. The routes, once established, are stored in a memory resource and/or in a data store of the DWM computing device 120. The routes are used by the inventory view routing module 126 to route incoming inventory view requests according to the established routes to the appropriate inventory view computing devices 110a and 110b. In examples, the inventory view routing module of the distributed workload management computing device reroutes the incoming inventory view request to a second appropriate one of the plurality of inventory view computing devices if the appropriate one of the plurality of inventory view computing devices is unavailable to generate the requested inventory view, thus providing redundancy and failover capabilities.

In an example, the route establishing module 124 may determine that a first view and a second view are to be generated by the inventory view computing device 110a while a third view is to be generated by the inventory view computing device 110b. The inventory view routing module 126 routes incoming inventory view requests for the first and second view to the inventory view computing device 110a while routing requests for the third view to the inventory view computing device 110b. Thus, the DWM computing device 120 provides horizontal scaling among the plurality of inventory view computing devices. The horizontal scaling, in examples, distributes routes to the inventory view requests approximately equally among the inventory view computing devices 110a and 110b (i.e., each inventory view computing device 110a and 110b receives approximately equal views). In other examples, the horizontal scaling may be asymmetrical. This enables different inventory view computing devices 110a and 110b to be implemented. For example, if one of the inventory view computing devices 110a and 110b has more computing resources (i.e., is considered to be more powerful or more efficient), it may receive a disproportionate amount of inventory views and/or inventory view requests.

The distributed computing system 100 provides failover and redundancy by providing for rerouting if one of the inventory view computing devices 110a and 110b becomes unavailable. For example, the inventory view routing module 126 of the distributed workload management computing device 120 reroutes the incoming inventory view request to a second appropriate one of the inventory view computing devices 110a and 110b if the initial intended one of the inventory view computing devices 110a and 110b is unavailable to generate the requested inventory view. For example, if the inventory view computing device 110a becomes unavailable, the inventory view routing module 126 may reroute requests intended for inventory view computing device 110a to inventory view computing device 110b. In the example in which the first and second views are generated by the inventory computing device 110a, these views would be generated by inventory view computing device 110b if inventory view computing device 110a were to fail or become unavailable.

In examples, the DWM computing device 110 may also include an inventory view configuration module to enable a user (e.g., system administrator) of the distributed computing system to modify at least one of the plurality of inventory view configuration properties. This provides the user with the ability to modify the views on the individual inventory view computing devices by modifying the inventory view configuration properties. In examples, each inventory view may have multiple configurations (and thus multiple inventory view configuration properties sets) associated therewith as described further regarding FIG. 6. A configuration may display the inventory-to-availability relationship maintained for active configurations by updating availability when inventory events and commerce events occur (i.e., when inventory changes). In examples, an inventory-to-availability relationship may not be maintained for inactive configurations, availability may not be updated after a configuration is deactivated, and activating a new configuration may automatically deactivate an existing configuration.

In other examples, the distributed computing system 100 includes a rules computing device to generate a work request, the work request being transmitted to the distributed workload management computing device which interprets the work request to modify the partial inventory data store. The rules computing device may be implemented as a module in the DWM computing device 120 and/or in one or more of the inventory view computing devices 110a and 110b. The work request represents, for example, a change in inventory, a commerce event, or other similar event.

Figure 2:
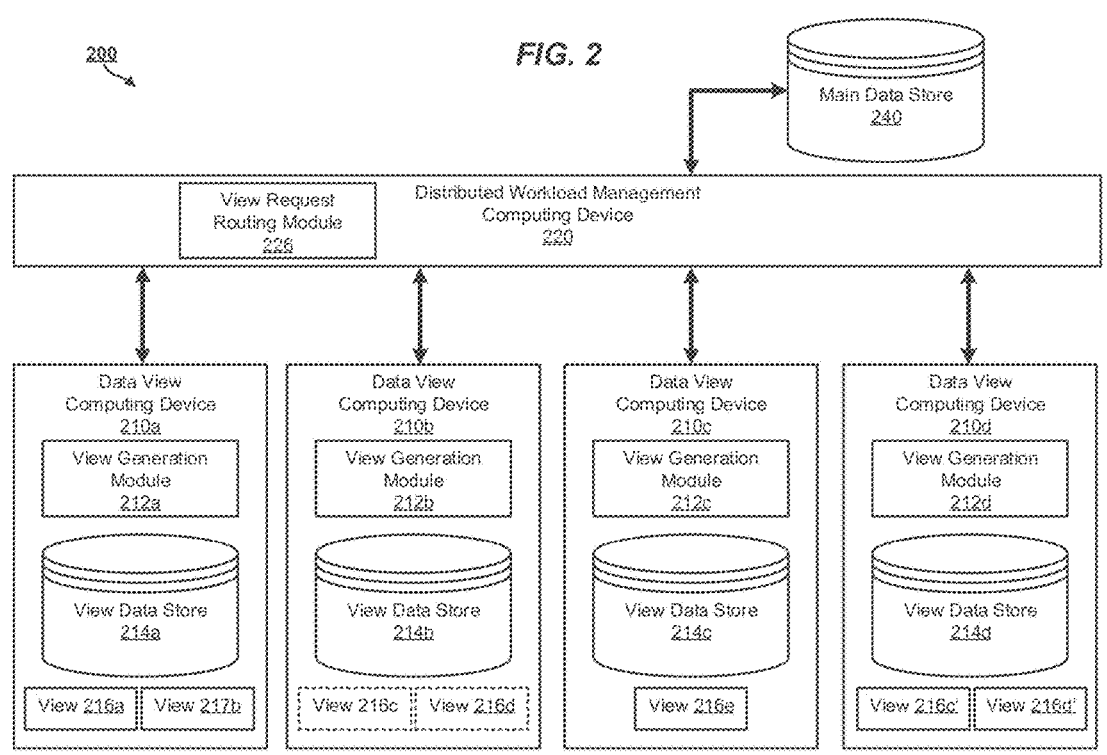
FIG. 2 illustrates a distributed computing system including a distributed workload management computing device and data view computing devices according to examples of the present disclosure.

FIG. 2 illustrates a distributed computing system 200 including a distributed workload management computing device 220 and data view computing devices 210a, 210b, 210c, and 210d according to examples of the present disclosure. The distributed workload management (DWM) computing device 220 and the data view computing devices 210a, 210b, 210c, and 210d may be similar to the respective DWM computing device 110 and inventory view computing devices 110a and 110b of FIG. 1. Data view computing device 210a generates in real time, via view generation module 212a, views 216a and 216b. Data view computing device 210b generates in real time, via view generation module 212b, views 216c and 216d. Data view computing device 210c generates in real time, via view generation module 212c, view 216e. Data view computing device 210d generates in real time, via view generation module 212d, views 216c' and 216d' on a redundant, failover basis, as discussed below.

In addition, the distributed computing system 200 includes a main data store 240 communicatively coupled to the DWM computing device 220. The main data store 240 stores data, such as inventory data or other types of data. It should be understood that any suitable type of data may be stored in the main data store 240.

The data stored in the main data store 240 may be sent, partially or wholly, to the view data stores 214a, 214b, 214c, and 214d, which may store, partially or wholly, copies of the data stored in the main data store 240. In examples, it may be beneficial to store only partial copies of the data in the view data stores 214a, 214b, 214c, and 214d. Data related to a view associated with a particular data view computing device may be stored in that view data store, while data relating to a view not associated with a particular data view computing device need not be stored in that data view computing device's view data store. For example, a copy of data relating to view 216b may be stored in view data store 214a of data view computing device 210a. This enables the data view computing device 210a to generate view 216d, via view generation module 212a, efficiently and in real time without having to query the main data store 240 responsive to receiving a request for view 216d.

When a user or the system requests a data view, for example view 216e, the request is received at the DWM computing device 220 and routed via the view request routing module 226 to the appropriate data view computing device, for example data view computing device 210c for view 216e using established routing or sequencing. The view generation module 212c of data view computing device 210c generates view 216e in real time using the partial view data stored in view data store 214c responsive to a received request from the user or the system for the view 216. The view 216e is then displayed or made available to the user. In other examples, a view, such as view 216e, may be automatically updated by the DWM computing device 220 and pushed, for example, to data view computing device 210c. This may occur when data changes after a user has requested the view 216e, for example.

In another example, if the user requests view 217d, but the data view computing device 210b is unavailable (e.g., it is temporarily down, it is unreachable, etc.) or if data view computing device 210b cannot otherwise fulfill the request, the DWM computing device 220, via the view routing module 226, may reroute the request for view 216d to data view computing device 210d, which may generate, via view generation module 212d, view 216d' using the partial view data stored in view data store 214d. In this way, the distributed computing system 200 provides redundancy and failover abilities.

Figure 3:
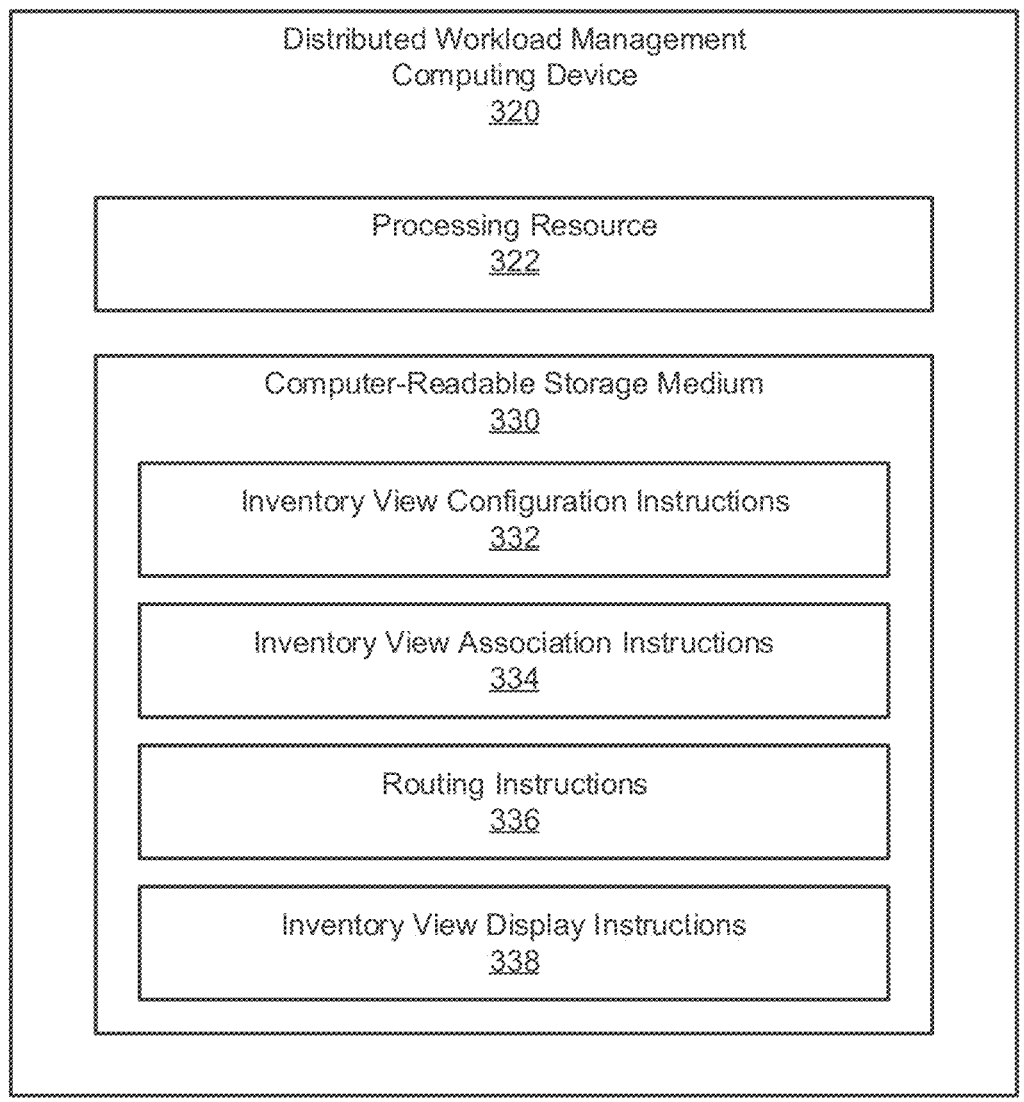
FIG. 3 illustrates a computer-readable storage medium within a distributed workload management computing device storing instructions to manage data workload according to examples of the present disclosure.

FIG. 3 illustrates a computer-readable storage medium 330 within a distributed workload management computing device 320 storing instructions to manage data workload according to examples of the present disclosure. The computer-readable storage medium 330 is non-transitory in the sense that it does not encompass a transitory signal but instead is made up of one or more memory components configured to store the instructions.

The computer-readable storage medium may store machine executable instructions in the form of modules, which are executable by a processing resource 322. The processing resource 322 represents generally any suitable type or form of processing unit or units capable of processing data or interpreting and executing instructions. The processing resource 322 may be one or more central processing units (CPUs), microprocessors, and/or other hardware devices suitable for retrieval and execution of instructions. The instructions may be stored, for example, on a non-transitory tangible computer-readable storage medium, such as computer-readable storage medium 330, which may include any electronic, magnetic, optical, or other physical storage device that stores executable instructions. Thus, the computer-readable storage medium 330 may be, for example, random access memory (RAM), electrically-erasable programmable read-only memory (EPPROM), a storage drive, an optical disk, and any other suitable type of volatile or non-volatile memory that stores instructions to cause a programmable processor (e.g., processing resource 322) to perform the techniques described herein. In examples, the computer-readable storage medium 330 may include a main memory, such as a RAM in which the instructions may be stored during runtime, and a secondary memory, such as a nonvolatile memory in which a copy of the instructions is stored.

The instructions may also be executable by individual computing devices of the distributed computing systems 100 and 200 of FIGS. 1 and 2 respectively such as DWM computing device 120 of FIG. 1 and/or DWM computing device 220 of FIG. 2. In the example shown in FIG. 3, the instructions may include inventory view configuration instructions 332, inventory view association instructions 334, routing instructions 336, and inventory data display instructions 338.

Figure 4:
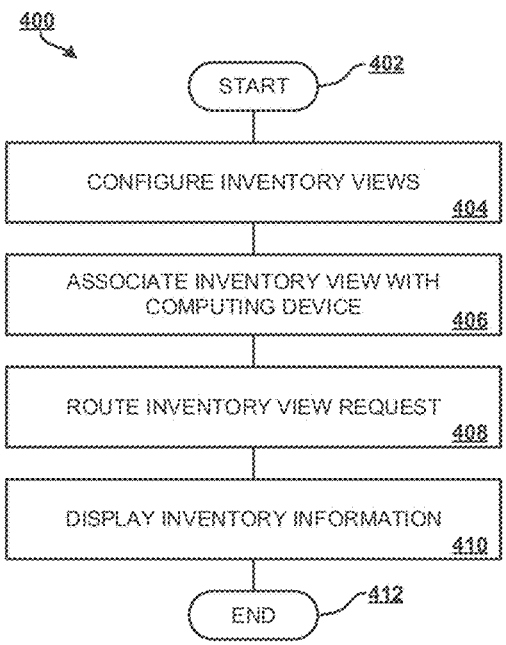
FIG. 4 illustrates a flow diagram of a method to manage a distributed workload according to examples of the present disclosure.

The modules of the computer-readable storage medium 330 may be executable so as to perform the techniques described herein, including the functionality described regarding the method 400 of FIG. 4. The functionality of these modules is described below with reference to the functional blocks of FIG. 4 but should not be construed as so limiting.

In particular, FIG. 4 illustrates a flow diagram of a method 400 to manage a distributed workload according to examples of the present disclosure. The method 400 may be stored as instructions on a non-transitory computer-readable storage medium such as computer-readable storage medium 330 of FIG. 3 or another suitable memory that, when executed by a processing resource cause the processor to perform the method 400. It should be appreciated that the method 400 may be executed by a distributed computing system (e.g., distributed computing systems 100 and 200 of FIGS. 1 and 2) and/or by a computing device such as DWM computing device 120 of FIG. 1, DWM computing device 220 of FIG. 2, and/or DWM computing device 320 of FIG. 3.

At block 402, the method 400 begins and continues to block 404. At block 404, the method 400 includes the DWM computing device (e.g., DWM computing device 320 of FIG. 3) configuring a plurality of inventory views by defining a plurality of inventory view configuration properties for each of the plurality of inventory views. The method 400 continues to block 406.

At block 406, the method 400 includes the DWM computing device associating each of the plurality of inventory views with one of a plurality of inventory view computing devices. The method 400 continues to block 408.

At block 408, the method 400 includes the DWM computing device routing an inventory view request to display a particular inventory view to the appropriate one of the plurality of inventory view computing devices based on an established routing configuration. The established routing configuration indicates which of the plurality of inventory view computing devices is to receive and process the inventory view request. Additionally, the established routing configuration further indicates which of the plurality of inventory view computing devices is to receive and process additional inventory view requests. The method 400 continues to block 410.

At block 410, the method 400 includes the DWM computing device causing to be displayed in real time, such as on an inventory view computing device (e.g., inventory view computing device 110a of FIG. 1), inventory data using the particular inventory view configuration properties related to the inventory view request to display the particular inventory view. The method 400 continues to block 412 and terminates.

Additional processes also may be included in the method 400. For example, the computer-readable storage medium 330 may include instructions to re-route the inventory view request to a second appropriate one of a plurality of inventory view computing devices based on an established routing configuration when the appropriate one of the plurality of inventory view computing devices is unavailable to display the particular inventory view. The plurality of inventory view configuration properties and the inventory information are stored, for example, in a partial inventory view data store (e.g., partial inventory view data store 114a of FIG. 1) on the appropriate one of the plurality of inventory view computing devices.

Additionally, the computer-readable storage medium 330 may include instructions to receive the inventory information from a main inventory data store (e.g., main data store 240 of FIG. 2), and to synchronize the inventory view data store with the inventory data store when the inventory information changes. It should be understood that the processes depicted in FIG. 4 represent illustrations, and that other processes may be added or existing processes may be removed, modified, or rearranged without departing from the scope and spirit of the present disclosure.

Figure 5:
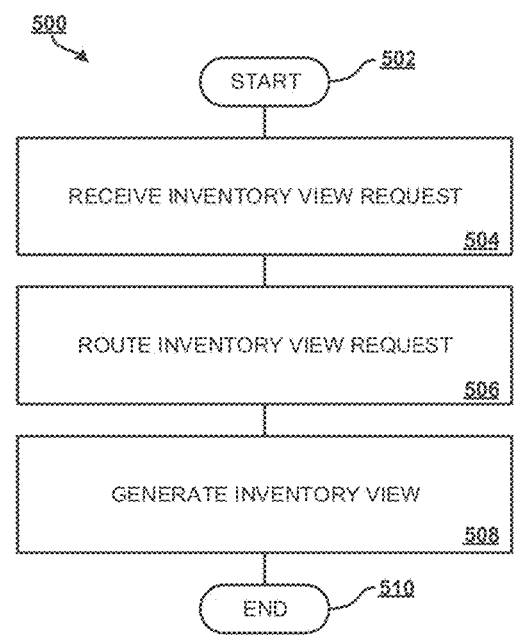
FIG. 5 illustrates flow diagram of a method to manage a distributed workload according to examples of the present disclosure.

FIG. 5 illustrates a flow diagram of a method 500 to manage a distributed workload according to examples of the present disclosure. It should be appreciated that the method 500 may be executed by a distributed computing system (e.g., distributed computing systems 100 and 200 of FIGS. 1 and 2) and/or by a computing device such as DWM computing device 120 of FIG. 1, DWM computing device 220 of FIG. 2, and/or DWM computing device 320 of FIG. 3.

At block 502, the method 500 begins and continues to block 504. At block 504, the method 500 includes a distributed workload management computing system (e.g., DWM computing system 120 of FIG. 1 and/or DWM computing system 220 of FIG. 2) receiving an inventory view request. In examples, the inventory view request may be received from any of a number of stakeholders in a commerce environment such as distribution center managers, store managers, store employees, and online shoppers. In other examples, the inventory view request may be received from the DWM computing device automatically, such as when inventory data changes. This enables a user of the inventory view to consume up-to-date inventory data. The method 500 then continues to block 506.

At block 506, the method 500 includes the distributed workload management computing system routing the inventory view request. For example, the inventory view request may be routed to an appropriate one of a plurality of inventory view computing devices based on an established routing configuration. In additional examples, the established routing configuration may indicate which of the plurality of inventory view computing devices is to receive and process the inventory view request. The established routing configuration may further indicate the appropriate routing for additional inventory view requests. The method 500 then continues to block 508.

At block 508, the method 500 includes an appropriate one of a plurality of inventory view computing devices (e.g., inventory view computing devices 110a and 110b of FIG. 1 and/or data view computing devices 210a-210d of FIG. 2) generating the inventory view. For example, the inventory view computing device generates, in real time, an inventory view in response to the received inventory view request. The inventory view is based at least in part on a plurality of inventory view configuration properties and partial inventory data, which is at least a partial copy of main inventory data. In examples, the plurality of inventory view configuration properties and partial inventory data are stored in a partial inventory view data store (e.g., partial inventory view data store 114a or 114b of FIG. 1) on the appropriate one of the plurality of inventory view computing devices. The partial inventory view data store receives the partial inventory data from a main inventory data (e.g., main data store 240 of FIG. 2) store storing the main inventory data. The partial inventory data store and the main inventory data store are synchronized, such as upon the occurrence of a change in inventory data.

Additional processes also may be included. For example, the distributed workload management computing device may re-rout the inventory view request to a second appropriate one of a plurality of inventory view computing devices based on an established routing configuration when the appropriate one of the plurality of inventory view computing devices is unavailable to generate the requested inventory view. It should be understood that the processes depicted in FIG. 5 represent illustrations, and that other processes may be added or existing processes may be removed, modified, or rearranged without departing from the scope and spirit of the present disclosure.

Figure 6:
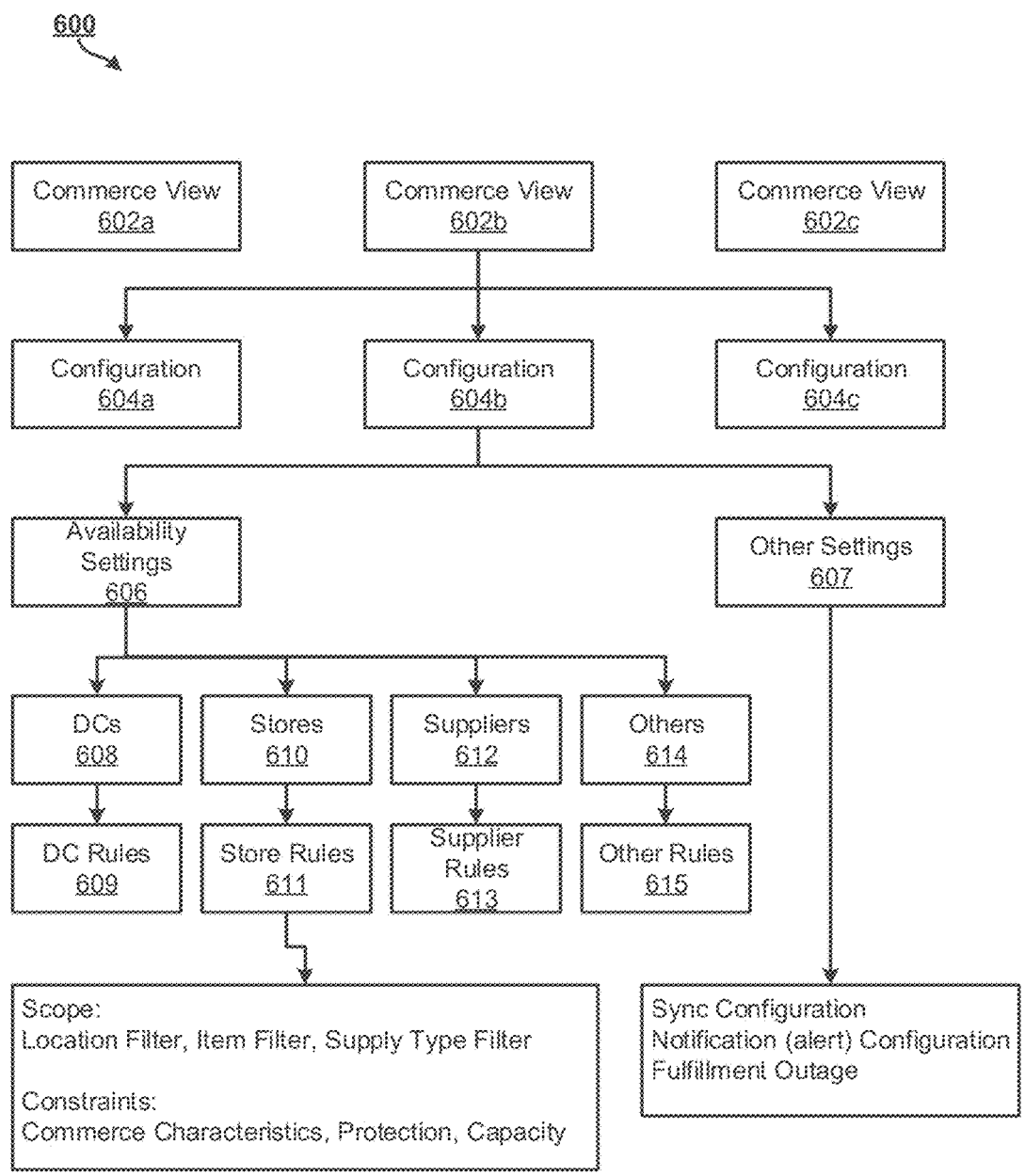
FIG. 6 illustrates a flow diagram of a work flow for distributed workload management according to examples of the present disclosure.

FIG. 6 illustrates a flow diagram of a work flow 600 for a distributed workload management according to examples of the present disclosure. Each distributed workload management implementation may utilize several commerce views (also known as inventory views) including commerce views 602a, 602b, and 602c. Additional commerce views may also be included. Within each commerce view, multiple configurations may be created. For example, commerce view 602b may have three configurations: configuration 604a, configuration 604b, and configuration 604c. At any given time, a single configuration may be active for each commerce view. In an example, configuration 604b of commerce view 602b may be active. Multiple configurations may be useful depending on, for example, the season of the year, a promotional period, a non-promotional period, etc. The configurations may be activated manually, such as by a system administrator, or automatically by a trigger event, such as a time or date range.

Within each of the configurations, two different types of settings are configurable: availability settings 606 and other settings 607. Availability settings 606 enable the configuration of availability using inventory from distribution centers (DCs) 608, stores 610, suppliers 612, and others 614 using one or more rule sets. Rule sets may be split into two sections: the scope and the constraints. For example, the scope section includes what locations, items, and supply types are considered in the commerce view. The constraints section includes the commerce characteristics (such as to only consider full price items) and protection and capacity constraints to protect inventory or ensure a facility's capacity is considered before including its inventory view.

Other settings 607 enable the configuration of when and how the distributed workload management system synchronizes with other systems and synchronizes its data between individual view computing devices and a main data store and define thresholds to determine when notifications are to be sent concerning inventory availability, among other things. In addition, the outage reason codes may be configured. The outage reason codes affect the facility's ability to contribute inventory to the commerce view.

FIGS. 7a-7c illustrate screenshots 700a-700c of a distributed workload management interface according to examples of the present disclosure. The screenshot 700a of FIG. 7a illustrates a configuration screen for a request to process a change in the main inventory database. Parameters such as retry, number of threads, and which inventory view computing devices to generate which views may be configured. For example, regarding which inventory view computing devices at which to generate which views, a first inventory view computing device may generate views 1 and 2, a second inventory view computing device may generate views 3 and 4, and a third inventory view computing device may generate views 5 and 6. In this way, the views are distributed equally among the three inventory view computing devices.

In other examples, the views may be distributed asymmetrically such that one inventory view computing device generates more views than another inventory view computing device. For example, the first inventory view computing device may generate views 1, 2, and 3, while the second inventory view computing device generates view 4 and the third inventory view computing device generates views 5 and 6. This may be useful if the inventory view computing devices have different hardware and/or software configurations such that one inventory view computing device may be faster or more powerful than another. Such an asymmetrical implementation may also be useful for providing failover or redundancy among a cluster of distributed inventory view computing devices such that one inventory view computing device may assume more load for generating views if another inventory view computing device fails or become unavailable.

The work type configuration details include information concerning a work request. For example, the work request may include a configuration name, an execution service, a retry limit, an execution location, a description, a sequence, a maximum thread count, and a time out limit. The work type may indicate what type of work the work request represents, such as an inventory modification when the main inventory data store experiences a change. The execution location indicates which of the inventory view computing devices executes the work request. The time out limit represents the amount of time spent attempting to execute a work request before timing out. Maximum thread count provides a limit for the number of work requests that can be processed concurrently by each of the inventory view computing devices. For example, if the maximum thread count is four, only four work request requests can be processed at the same time and any additional work request requests will be queued to be processed later. Limiting the thread count may be useful to maximize computing device efficiency based on the number of processing threads or cores, for example, of a processing resource within a computing device.

The screenshot 700b of FIG. 7b illustrates a performance screen to show individual inventory view computing device statistics, such as work type, total view requests, number of successes, number of failures, number of retries, average wait time (i.e., how much time to initiate processing a request), average execution time (i.e., how much time to process a request once started), average total processing time (i.e., how much time to initiate and process the request—the sum of the average wait time and the average execution time), and the like. The inventory view computing devices listed in FIG. 7b process inventory view work requests.

The statistics associated with each of the inventory view computing devices and the requests represent the information relating to the performance of each of the inventory view computing devices while executing the inventory view work requests. An inventory view computing device with a high average total processing time may indicate a problem with the inventory view computing device or something relating to the inventory view computing device, such as the network or other such issues. In examples, a system user or administrator may utilize the statistics to rebalance the inventory view computing devices by moving views from one inventory view computing device to another.

The screenshot 700c of FIG. 7c illustrates inventory view computing device statistics by work request. For example, a work request may be to process a change in a view. The work request may also indicate which view is being processed and at which inventory view computing device. The statistics may include information about the work request requests including, for example, work request number, work type, status, submission node (e.g., user computing device), submission date/time, execution node (e.g., inventory view computing device), execution start date/time, execution end date/time, total execution time, work request, retry count, worker, and sequence key, among others.

Figure 8:
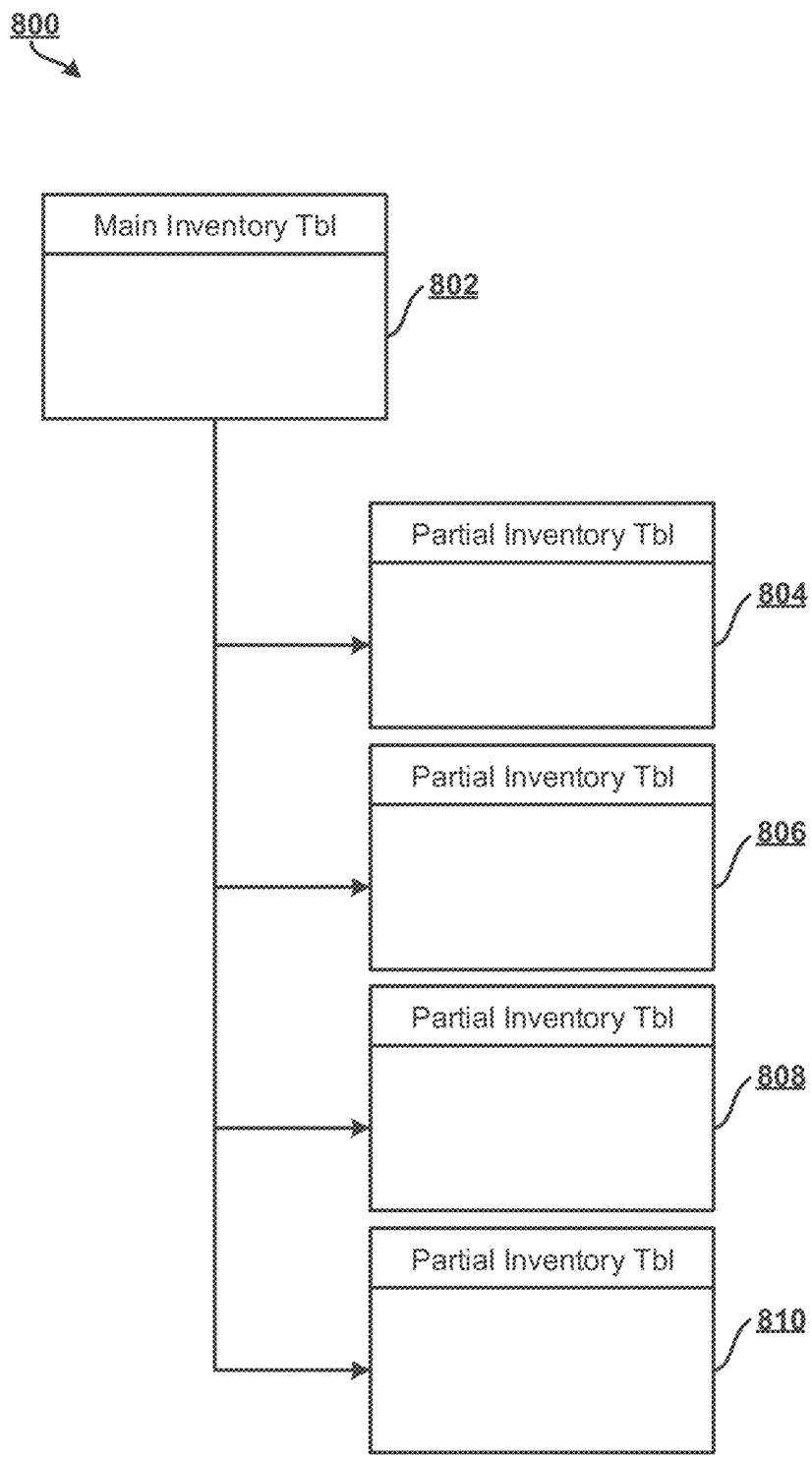
FIG. 8 illustrates a block diagram of a database table structure for distributed workload management according to examples of the present disclosure.

FIG. 8 illustrates a block diagram of a database table structure 800 for distributed workload management according to examples of the present disclosure. As discussed above, the inventory data may be stored both in a main data store (e.g., main data store 240 of FIG. 2) accessible by a distributed workload management computing device (e.g., DWM computing device 220 of FIG. 2) and in view data stores on individual data view computing devices (e.g., data view store 214a of data view computing device 210a).

In another example, the data may be stored across multiple tables of a distributed database as shown in FIG. 8. For example, main inventory table 802 may reside on a main data store and may contain whole or total inventory data (that is, all data records relating to inventory). Each of the partial inventory tables 804, 806, 808, and 810 may contain partial inventory data for the inventory view(s) associated with the computing device upon which the partial inventory tables 804, 806, 808, and 810 are stored. For example, applying this technique to FIG. 2, the main inventory table 802 may be stored on the main data store 240. The partial inventory table 804 may be stored in the view data store 214a of data view computing device 210a. Similarly, the partial inventory tables 806, 808, and 810 may be stored on the view data stores 214b, 214c, and 214d of data view computing devices 210b, 210c, and 210d respectively.

This example of table partitioning enables the data view computing devices to generate, in real time, data views (e.g., inventory views) based on the data associated with the requested data view stored in the local partial inventory table. Data is synchronized between the partial inventory tables and the main inventory table, for example, when a partitioned table and/or its data changes. This ensures that the data remain up-to-date.

Figure 9A:
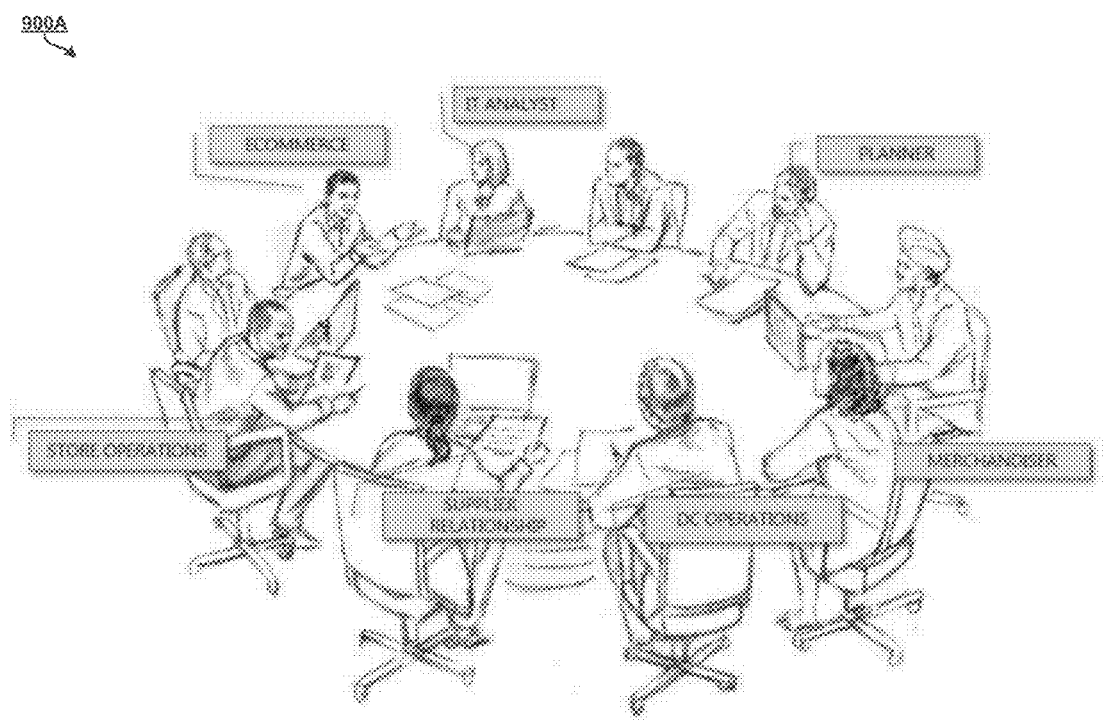
FIG. 9A illustrates a diagram of stakeholders of a distributed workload management system according to examples of the present disclosure.

FIG. 9A illustrates a diagram 900A of stakeholders of a distributed workload management system according to examples of the present disclosure. The stakeholders may have different roles within a company utilizing the distributed workload management system and thus may have different needs for inventory information. The distributed workload management system of the present disclosure enables each of the stakeholders to define inventory views suitable to each stakeholder's individual needs. The stakeholders of FIG. 9A configure views, such as those illustrated in FIG. 10, described below, based on configuration details, such as those described regarding FIGS. 9B-9E.

Figure 9B:
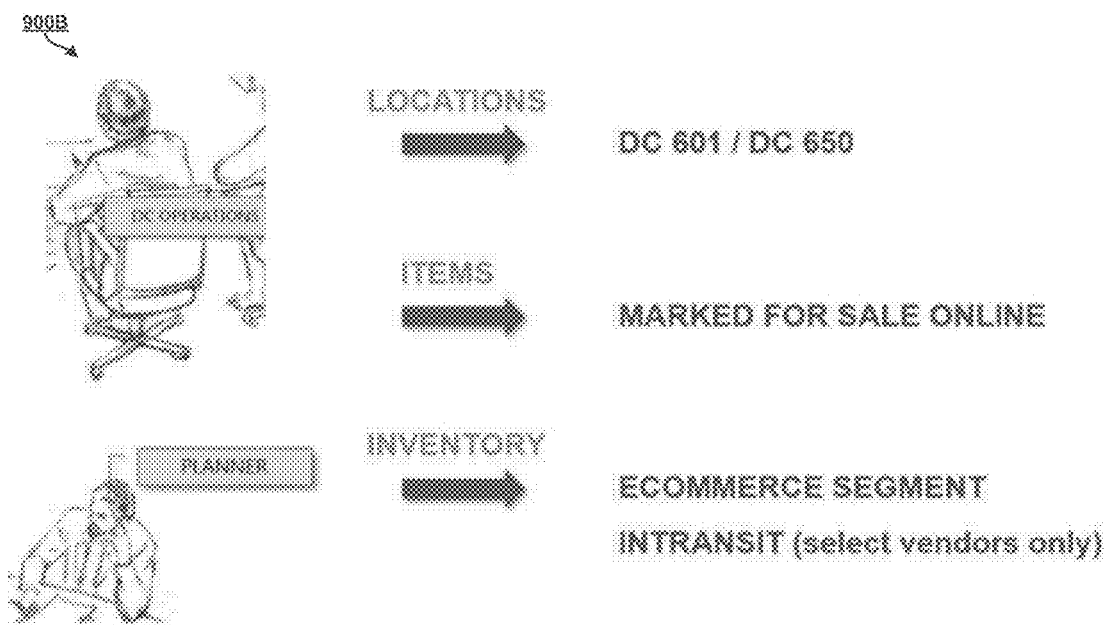
FIGS. 9B-9E illustrate various availability configurations for inventory views by the stakeholders of FIG. 9A according to examples of the present disclosure.

FIG. 9B illustrates an example of distribution center (DC) availability configuration details 900B, as configured by stakeholders "DC operations" and "planner" for summer season availability. As illustrated in FIG. 9B, the stakeholders have selected "DC 601" and "DC 650" as the locations attribute, "marked for sale online" as the items attribute, and "e-commerce segment in transit for select vendors only" as the inventory attribute.

Figure 9C:
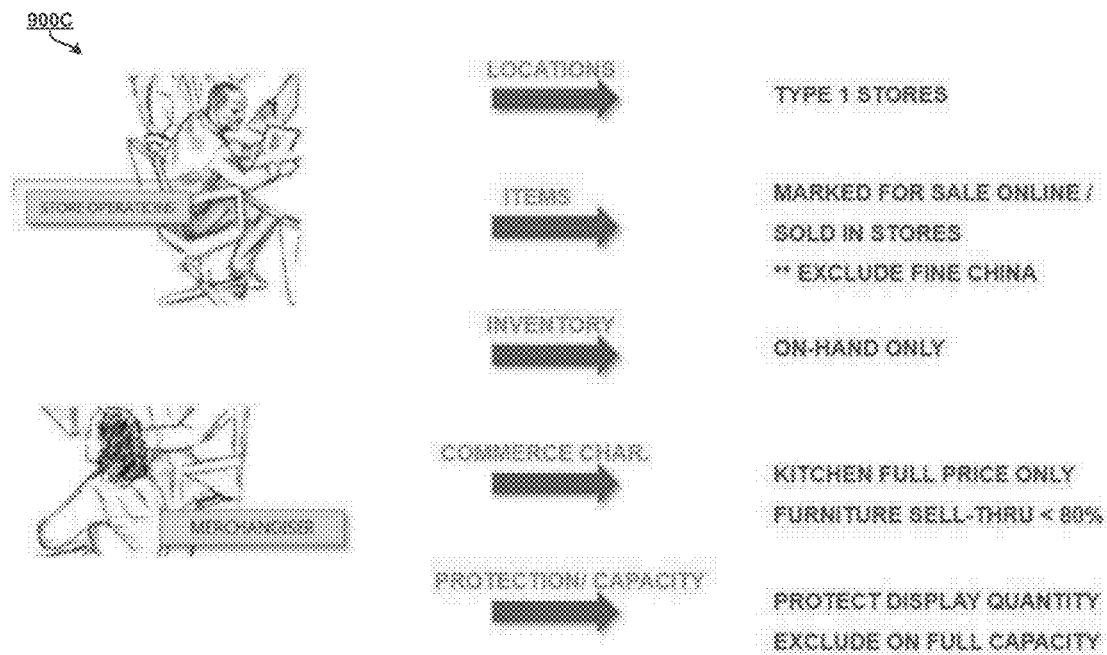

FIG. 9C illustrates an example of store availability configuration details 900C, as configured by stakeholders "store operations" and "merchandiser" for summer season availability. As illustrated in FIG. 9C, the stakeholders have selected "type one stores" as the locations attribute, "marked for sale online" and "sold in stores" with an exclusion for "fine china" as the items attribute, "on-hand only" as the inventory attribute, "kitchen full price only" and "furniture sell-through <80%" for commerce characteristics attribute, and "protect display quantity" and "exclude on full capacity" for the protection and capacity attribute.

Figure 9D:
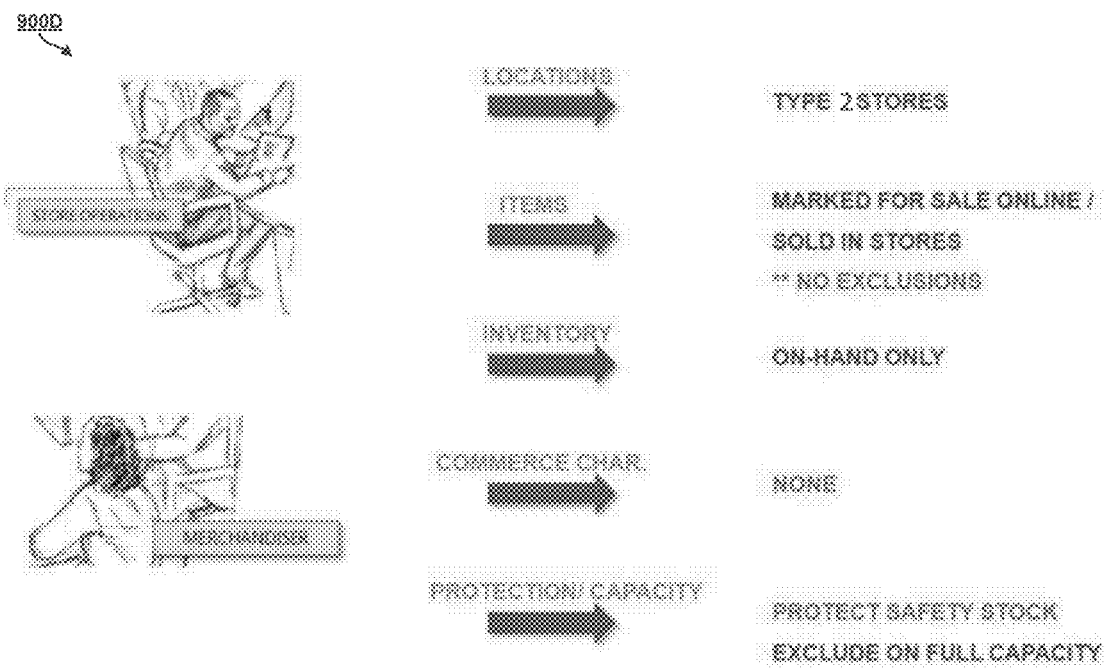

FIG. 9D illustrates another example of store availability configuration details 900D, as configured by the "store operations" and "merchandiser" stakeholders similar to the example illustrated in FIG. 9C. However, the configuration attributes for the example illustrated in FIG. 9D are as follows: "type one stores" is the locations attribute, "marked for sale online" and "sold in stores" with no exclusions is the items attribute, "on-hand only" is the inventory attribute, the commerce characteristics attribute is set to "none," and "protection safety stock" and "exclude on full capacity" is the protection and capacity attribute.

Figure 9E:
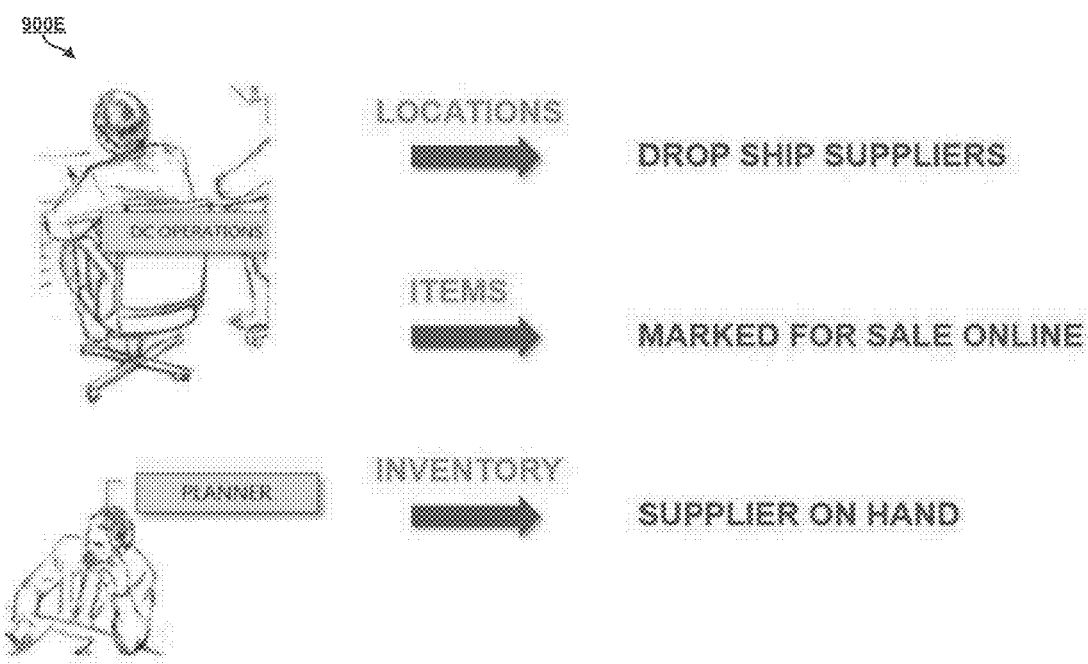

FIG. 9E illustrates an example of suppliers availability configuration details 900E, as configured by the "DC operations" and "planner" stakeholders of FIG. 9A for summer season availability. In the example of FIG. 9, the stakeholders have selected the following configuration attributes: The locations attribute is set to "drop ship suppliers," the items attribute is set to "marked for sale online," and the inventory attribute is set to "supplier on hand."

It should be appreciated that the examples illustrated in FIGS. 9B-9E are merely examples of various stakeholders selecting attributes for configuring different views. As shown, different stakeholders may be involved in defining different views, with some stakeholders being involved in defining multiple views. These examples should not be construed as limiting but rather are merely illustrative.

Figure 10:
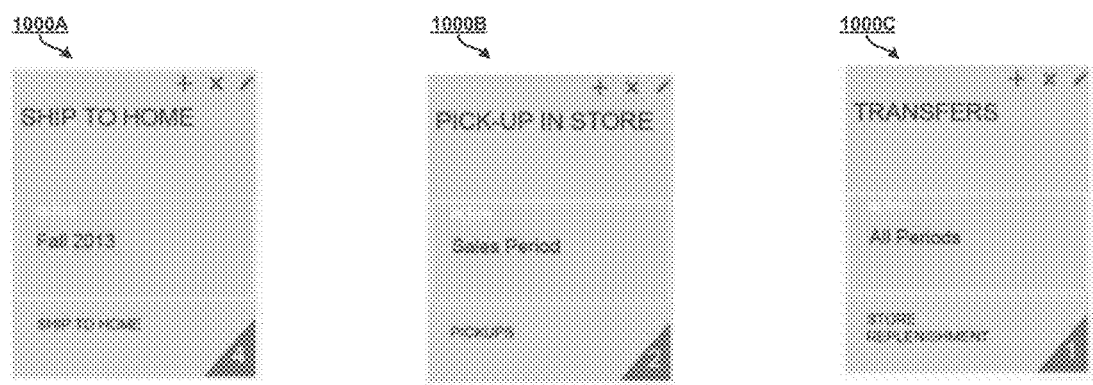
FIG. 10 illustrates screen shots of three inventory views according to examples of the present disclosure.

FIG. 10 illustrates screen shots of three inventory views 1000A-1000C according to examples of the present disclosure. Each of the inventory views 1000A-1000C may be beneficial to different customers or stakeholders in the inventory system. In particular, inventory view 1000A is an aggregate inventory view ("ship to home") that includes inventory information for stores enabled for shipment and items eligible for shipment. This information is across the inventory system and includes only inventory available from stores that can ship the item. The inventory view 1000A also takes into account protected display quantity and removes clearance inventory.

Inventory view 1000B is a facility view ("pick-up in store") that includes stores enabled for pick-up (as opposed to shipment) and includes items eligible for pick-up. Inventory view 1000B provides no quantity protection as in inventory view 1000A. Inventory view 1000C is another aggregate inventory view ("transfers") showing all stores and inactive items or poor sell-through items with no inventory protection.

Figure 11:
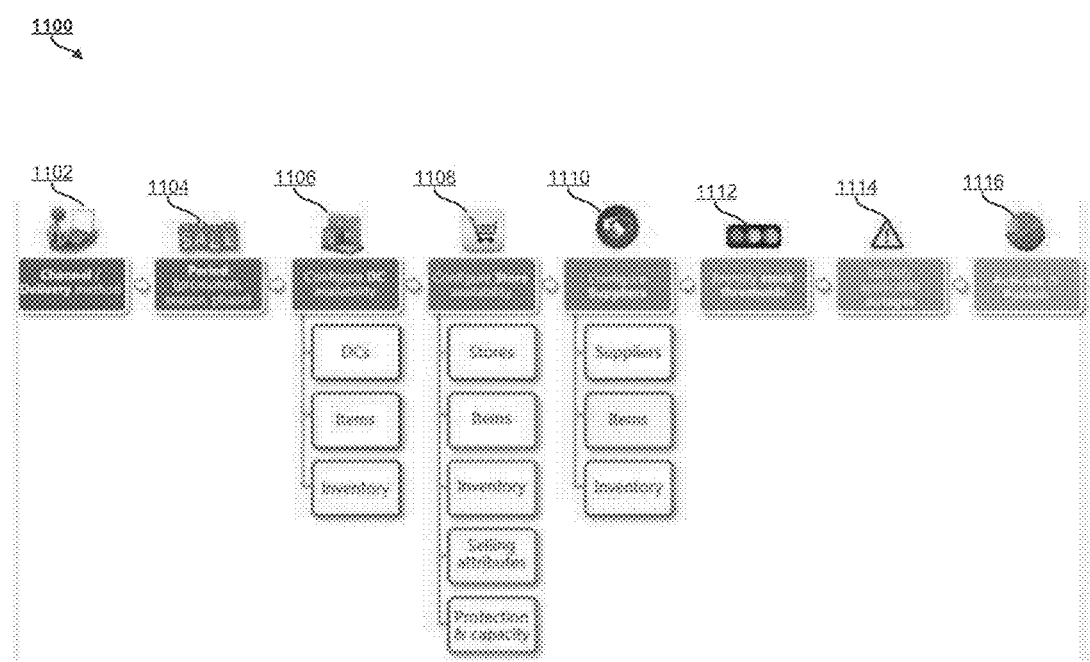
FIG. 11 illustrates a flow diagram of a view configuration process for a distributed workload management system according to examples of the present disclosure.

FIG. 11 illustrates a flow diagram of a view configuration process 1100 for a distributed workload management system according to examples of the present disclosure. The process 1100 begins with a channel/delivery method selection (e.g., pick-up in store, ship to home, etc.) (block 1102). A period (e.g., promotion, season, phase, etc.) is then selected during which the view is active (block 1104). Distribution center availability (block 1106), store availability (block 1108), and suppliers availability (block 1110) are then configured.

Distribution center availability configuration may include selection of the distribution center(s), the item(s), and/or the inventory. Store availability configuration may include selection of the store(s), item(s), inventory, selling attribute(s), and/or protection and capacity. Supplier availability configuration may include selection of the supplier(s), item(s), and/or inventory. Stock thresholds may then be set in order to protect items from being shown in certain views when item is below the stock threshold (block 1112). Outages may also be identified (block 1114). Finally, the view may be published and activated (block 1116). It should be understood that the technical details described in the present disclosure apply to the process 1100 and the process 1100 may be performed by any suitable computing device or computing system, such as those computing systems described herein.

Figure 12:
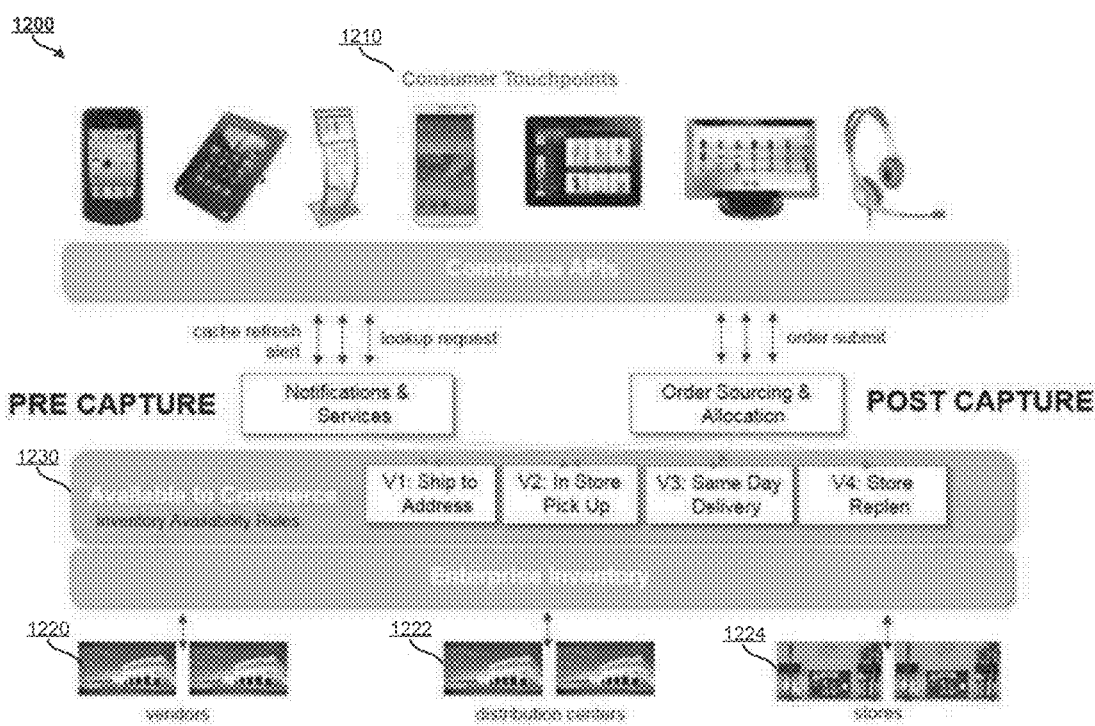
FIG. 12 illustrates an environment for inventory distributed workload management according to examples of the present disclosure.

FIG. 12 illustrates an environment 1200 for inventory distributed workload management according to examples of the present disclosure. The environment 1200 enables inventory management between consumers (such as consumer touchpoints 1210) and vendors 1220, distribution centers 1222, and stores 1224) through a distributed workload management system 1230 (shown as "available to commerce" in FIG. 12). The DWM system 1230 enables the enterprise inventory, shared among the vendors 1220, distribution centers 1224, and stores 1224, to be made available to the consumer touchpoints 1210 through pre-capture and post-capture events. The pre-capture events provide cache refresh alerts and lookup requests for the inventory, while the post-capture events provide order submission to apply order sourcing and allocation of inventory. In particular, the DWM system 1230 provides, for example, four views (e.g., V1: ship to address; V2: in store pick up; V3: same day delivery; and V4: store replenish), which are available to various consumers through their consumer touchpoints 1210. These views provide inventory availability based on inventory availability rules, for example.

Figure 13:
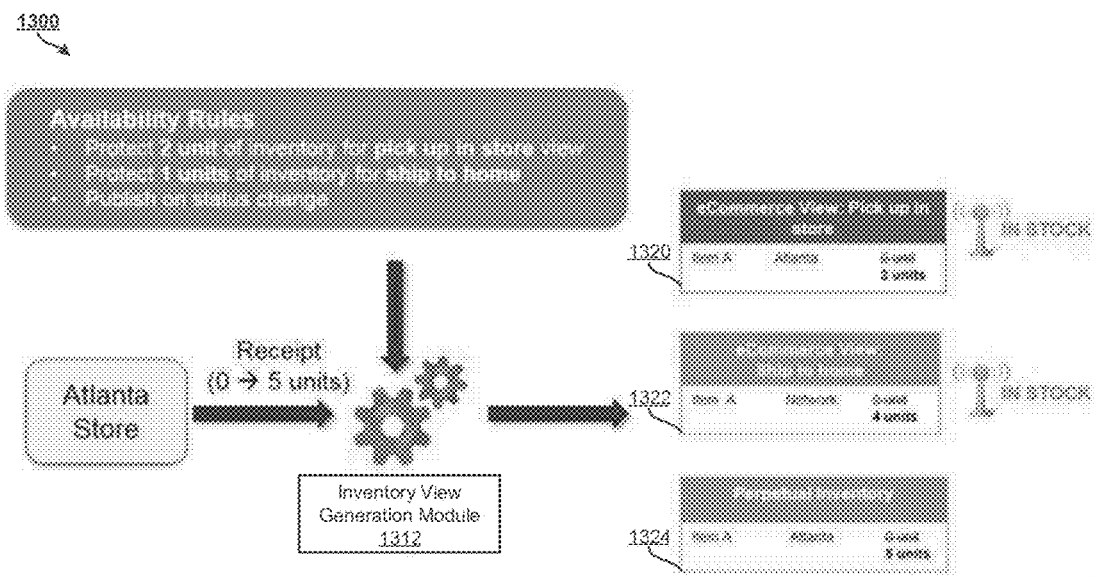
FIG. 13 illustrates a flow diagram of processing inventory events according to examples of the present disclosure.

FIG. 13 illustrates a flow diagram of processing inventory events 1300 according to examples of the present disclosure. In examples, the inventory events 1300 may be processed by the inventory view generation modules 112 and 212 of FIGS. 1 and 2 respectively. In the example illustrated in FIG. 13, the following inventory availability rules are applied: protect two units of inventory for pick up in store view; protect 1 unit of inventory for ship to home view; and publish on status change. In other words, two units of inventory are "protected" (i.e., not shown as available in the view) for the "pick up in store" view 1320, one unit of inventory is protected for the "ship to home" view 1322, and the inventory is republished to the views 1320 and 1322 upon status changes.

Using these rules, FIG. 13 illustrates the processing sequence when five inventory units are received (shown as being from an "Atlanta store") into the inventory view generation module 1312. When the units are made available, the inventory view generation module 1312 applies the availability rules to generate the views 1320 and 1322. Knowing that five units were made available by the Atlanta store, the pick up in store view 1320 is refreshed to show that three units are available (taking into consideration the rule protecting two units from that view). Similarly, the ship to home view 1322 is refreshed to show that four units are available (taking into consideration the rule protecting one unit from that view). The perpetual inventory view 1324 shows all five available units.

Figure 14:
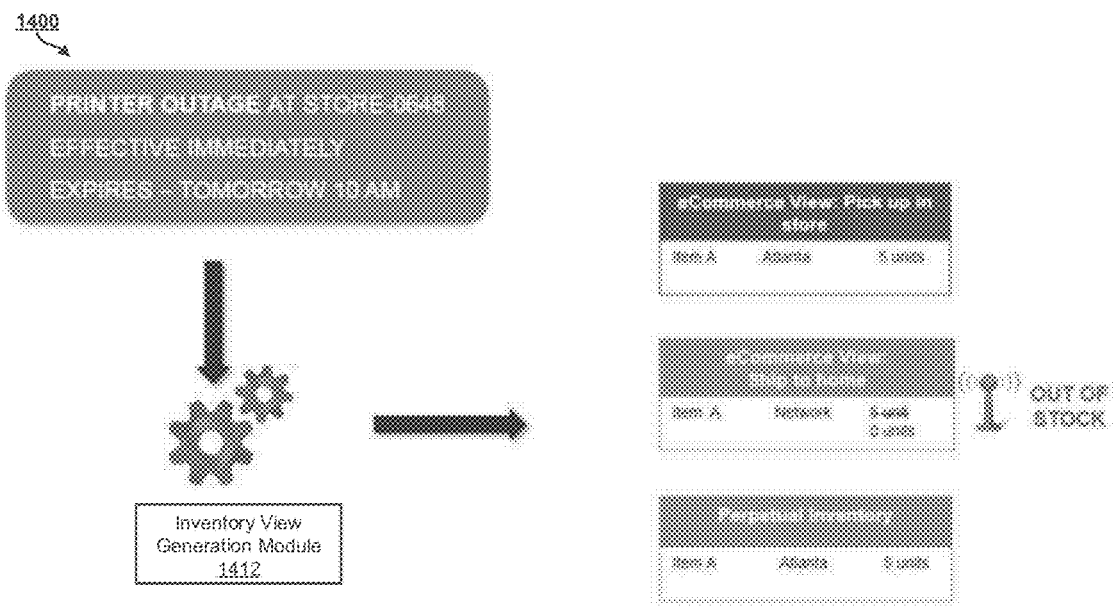
FIG. 14 illustrates a flow diagram of processing inventory outages according to examples of the present disclosure.

FIG. 14 illustrates a flow diagram of processing inventory outages 1300 according to examples of the present disclosure. In examples, the inventory outages 1300 may be processed by the inventory view generation modules 112 and 212 of FIGS. 1 and 2 respectively. FIG. 14 illustrates the situation where an outage affects one view but not another view. In this example, the inventory view generation module 1312 applies an outage to the "ship to home" view 1422 upon receiving a notification that a printer outage occurred at store 0648. As illustrated in FIG. 14, the inventory for view 1422 is reduced to zero, while the perpetual inventory 1424 and the pick up in store view 1420 remain at five units each.

It should be emphasized that the above-described examples are merely possible examples of implementations and set forth for a clear understanding of the present disclosure. Many variations and modifications may be made to the above-described examples without departing substantially from the spirit and principles of the present disclosure. Further, the scope of the present disclosure is intended to cover any and all appropriate combinations and sub-combinations of all elements, features, and aspects discussed above. All such appropriate modifications and variations are intended to be included within the scope of the present disclosure, and all possible claims to individual aspects or combinations of elements or steps are intended to be supported by the present disclosure.

What is claimed is:

1. A distributed computing system, comprising:
    a main data store to store main data;
    a plurality of data view computing devices, each of the plurality of data view computing devices comprising:
        a partial data view data store to store at least one of a plurality of data view configuration properties and a partial copy of the main data, the partial copy of the main data being received from the main data store, and
        a data view generation module to generate a data view based at least in part on the plurality of data view configuration properties and the partial copy of the main data, the generation being in real time and being responsive to one of a plurality of data view requests; and
    a distributed workload management computing device communicatively coupleable to each of the plurality of data view computing devices and to the main data store, the distributed workload management computing device comprising:
        a route establishing module to establish a route for each of the plurality of data view requests to an appropriate one of the plurality of data view computing devices based at least in part on a data type property, and
        a data view routing module to route incoming data view requests according to the established routes to the appropriate one of the plurality of data view computing devices.

2. The distributed computing system of claim 1, wherein the data view routing module of the distributed workload management computing device reroutes the incoming data view request to a second appropriate one of the plurality of data view computing devices if the appropriate one of the plurality of data view computing devices is unavailable to generate the requested data view.

3. The distributed computing system of claim 1, wherein the distributed workload management computing device further comprises:
    a data view configuration module to enable a user of the distributed computing system to modify at least one of the plurality of data view configuration properties.

4. The distributed computing system of claim 1, wherein the distributed workload management computing device provides horizontal scaling among the plurality of data view computing devices.

5. The distributed computing system of claim 4, wherein the horizontal scaling distributes the route establishing of the data view requests approximately equally among the plurality of data view computing devices.

6. The distributed computing system of claim 1, wherein the data view generation module accesses and utilizes the partial copy of the main data to generate the data view.

7. The distributed computing system of claim 1, further comprising:
    a rules computing device to generate a work request, the work request being transmitted to the distributed workload management computing device which interprets the work request to modify the partial data view data store.

8. The distributed computing system of claim 7, wherein the work request represents a change in data.

9. A method, comprising:
    receiving, by a distributed workload management computing device, a data view request;
    routing, by the distributed workload management computing device, the data view request to an appropriate one of a plurality of data view computing devices based on an established routing configuration;
    generating, by the appropriate one of the plurality of data view computing devices, in real time a data view in response to the received data view request, the data view being based at least in part on a plurality of data view configuration properties and partial data, the partial data being at least a partial copy of main data; and
    synchronizing, by the appropriate one of the plurality of data view computing devices, the partial data and the main data.

10. The method of claim 9, wherein the partial data and the main data are synchronized upon an occurrence of a change in data in one of the partial data and the main data.

11. The method of claim 9, wherein the established routing configuration indicates which of the plurality of data view computing devices is to receive and process the data view request.

12. The method of claim 11, wherein the established routing configuration further indicates which of the plurality of data view computing devices is to receive and process additional data view requests.

13. The method of claim 9, further comprising:
    re-routing, by the distributed workload management computing device, the data view request to a second appropriate one of a plurality of data view computing devices based on an established routing configuration when the appropriate one of the plurality of data view computing devices is unavailable to generate the requested data view.

14. The method of claim 9, wherein the plurality of data view configuration properties and partial data are stored in a partial data view data store on the appropriate one of the plurality of data view computing devices.

15. The method of claim 14, wherein the partial data view data store receives the partial data from a main data store storing the main data.

16. A non-transitory computer-readable storage medium storing instructions that, when executed by a processing resource, cause the processing resource to:
receive a partial data table from a main data table;
generate in real time a data view in response to a data view request, the data view being based at least in part on a plurality of data view configuration properties and partial data stored in the received partial data table, the partial data table storing the partial data that represents at least a partial copy of main data stored in the main data table; and
synchronize the partial data table and the main data table, wherein synchronizing the partial data table and the main data table occurs responsive to a change in one of the partial data and the main data.

17. A non-transitory computer-readable storage medium storing instructions that, when executed by a processing resource, cause the processing resource to:
receive a partial data table from a main data table;
generate in real time a data view in response to a data view request, the data view being based at least in part on a plurality of data view configuration properties and partial data stored in the received partial data table, the partial data table storing the partial data that represents at least a partial copy of main data stored in the main data table; and
synchronize the partial data table and the main data table, wherein an established routing configuration indicates which of a plurality of data view computing devices is to receive and process the data view request, and wherein the established routing configuration further indicates which of the plurality of data view computing devices is to receive and process additional data view requests.

18. The non-transitory computer-readable storage medium of claim 17, further storing instructions that, when executed by the processing resource, cause the processing resource to:
re-route the data view request to an appropriate one of the plurality of data view computing devices based on the established routing configuration when the appropriate one of the plurality of data view computing devices is unavailable to display a particular data view.

19. A distributed computing system, comprising:
a main data store to store main data;
a first data view computing device comprising:
a first partial data view data store to store a first plurality of data view configuration properties and a first partial copy of the main data, the partial copy of the main data being received from the main data store, and
a first data view generation module to generate a first data view based at least in part on the first plurality of data view configuration properties and the first partial copy of the main data, the generation being in real time and being responsive to a first data view request; and
a second data view computing device comprising:
a second partial data view data store to store a second plurality of data view configuration properties and a second partial copy of the main data, the second partial copy of the main data being received from the main data store and being different from the first partial copy of the main data, and
a second data view generation module to generate a second data view based at least in part on the second plurality of data view configuration properties and the second partial copy of the main data, the generation being in real time and being responsive to a second data view request.

20. The distributed computing system of claim 19, further comprising:
a distributed workload management computing device communicatively coupleable to the first and the second data view computing devices and to the main data store, the distributed workload management computing device comprising:
a route establishing module to establish a route for each of the first and the second data view requests to an appropriate one of the first and second data view computing devices based at least in part on a data type property, and
a data view routing module to route incoming data view requests according to the established routes to the appropriate one of the first and second data view computing devices.

21. The distributed computing system of claim 19, wherein:
the first data view computing device further comprises:
a first synchronization module to synchronize the first partial copy of the main data and the main data when the first partial copy of the main data changes; and
the second data view computing device further comprises:
a second synchronization module to synchronize the second partial copy of the main data and the main data when the second partial copy of the main data changes.

22. The distributed computing system of claim 19, wherein:
the first partial data view data store stores the first partial copy of the main data in a first partial data table,
the second partial data view data store stores the second partial copy of the main data in a second partial data table, and
the main data store stores the main data in a main data table.

* * * * *